United States Patent
Haumont et al.

(10) Patent No.: US 7,688,731 B2
(45) Date of Patent: Mar. 30, 2010

(54) TRAFFIC CONGESTION

(75) Inventors: Serge Haumont, Helsinki (FI); Tero Mäkelä, Helsinki (FI)

(73) Assignee: Nokia Corporation, Espoo (FI)

( * ) Notice: Subject to any disclaimer, the term of this patent is extended or adjusted under 35 U.S.C. 154(b) by 1215 days.

(21) Appl. No.: 10/450,960

(22) PCT Filed: Nov. 20, 2001

(86) PCT No.: PCT/EP01/13541

§ 371 (c)(1),
(2), (4) Date: Nov. 14, 2003

(87) PCT Pub. No.: WO02/052886

PCT Pub. Date: Jul. 4, 2002

(65) Prior Publication Data

US 2004/0071086 A1    Apr. 15, 2004

(30) Foreign Application Priority Data

Dec. 22, 2000  (GB) ................................. 0031535.8

(51) Int. Cl.
*G01R 31/08*    (2006.01)
(52) U.S. Cl. ..................................... 370/235
(58) Field of Classification Search .......... 370/229–240
See application file for complete search history.

(56) References Cited

U.S. PATENT DOCUMENTS

| | | | | |
|---|---|---|---|---|
| 5,640,604 A | * | 6/1997 | Hirano | 710/56 |
| 6,046,983 A | * | 4/2000 | Hasegawa et al. | 370/236.1 |
| 6,097,697 A | * | 8/2000 | Yao et al. | 370/230 |
| 6,122,251 A | * | 9/2000 | Shinohara | 370/231 |
| 6,192,422 B1 | * | 2/2001 | Daines et al. | 710/29 |
| 6,259,696 B1 | * | 7/2001 | Yazaki et al. | 370/395.21 |
| 6,324,165 B1 | * | 11/2001 | Fan et al. | 370/232 |
| 6,424,624 B1 | * | 7/2002 | Galand et al. | 370/231 |
| 6,477,143 B1 | * | 11/2002 | Ginossar | 370/230 |
| 6,570,848 B1 | * | 5/2003 | Loughran et al. | 370/230.1 |
| 6,901,065 B1 | * | 5/2005 | Ehrstedt et al. | 370/341 |
| 6,922,390 B1 | * | 7/2005 | Chapman et al. | 370/229 |
| 6,934,253 B2 | * | 8/2005 | Hoogenboom et al. | 370/232 |
| 7,106,694 B1 | * | 9/2006 | Salonen et al. | 370/230 |
| 2004/0066743 A1 | * | 4/2004 | Shimojo et al. | 370/229 |

FOREIGN PATENT DOCUMENTS

EP    0 812 083 A1    12/1997

* cited by examiner

*Primary Examiner*—Kwang B Yao
*Assistant Examiner*—Tung Q Tran
(74) *Attorney, Agent, or Firm*—Alston & Bird LLP

(57) ABSTRACT

The invention relates to methods and apparatus for controlling traffic congestion of communication traffic in a communication network. The network includes a first node which is operable to receive communication traffic in the form of data from one of more sending nodes and to pass that data to one or more receiving nodes. The method includes monitoring the possible output data rate of the first node and detecting if the possible output data rate becomes smaller than a maximum data rate value and responsive to that monitoring step performing congestion control whereby the data throughput of a flow of data through the first node is decreased.

62 Claims, 6 Drawing Sheets

TRAFFIC CONGESTION

FIELD OF THE INVENTION

The present invention relates to methods and apparatus for controlling traffic congestion in communications networks.

BACKGROUND OF THE INVENTION

A communication system may provide the user, or more precisely, user equipment or terminal, with connection-oriented communication services and/or connectionless communication services. An example of the first type is a circuit switched connection where a circuit is set-up with call set-up and admission control. An example of a connectionless communication service is a so called packet switched service which is typically used in communications based on the Internet Protocol (IP). Both of the circuit switched and the packet switched services can be used for communicating packet data. Packet data services can be defined in general as services that are capable of transporting data units (data packets or similar data entities of fixed or variable length) between two signalling points, such as between two terminals or other nodes of the communication system.

A network that is capable of transporting data units or data entities between two or more nodes is referred to in the following as a data network. The data network may be a communication network based on use of a fixed line or wireless communication media. The wireless connection may be used only for a part of the connection between the two nodes. A TCP/IP (Transfer Control Protocol/Internet Protocol) based data network is mentioned herein as an example of a packet switched data network. An ATM (Asynchronous Transfer Mode) based communication network is an example of a circuit switched data network to which embodiments of the invention could also be applied. Examples of communication networks that are capable of providing wireless services, such as IP (Internet Protocol) or ATM/AAL2 (Asynchronous Transfer Mode/ATM Adaptation Layer type 2) based packet data transmissions, include, without limiting to these, the GSM (Global System for Mobile communications) based GPRS (General Packet Radio Service) network, EDGE (enhanced data rate for GSM evolution) Mobile Data Network and third generation telecommunication systems such as the CDMA (code division multiple access) or TDMA (time division multiple access) based $3^{rd}$ generation telecommunication systems that are sometimes referred to as Universal Mobile Telecommunication System (UMTS), and IMT 2000 (International Mobile Telecommunication System 2000). All of the above systems can transfer data to and from mobile stations or similar user equipment providing the user thereof with a wireless interface for the data transmission.

Communication traffic can become congested at network nodes if the data is received at a node at a rate greater than the maximum data throughput rate of that node. Typically, congestion occurs at a node when the node has a lower data throughput rate than the node which precedes it in the same direction of flow. Similarly, congestion occurs when a node receives data from a plurality of data sources and the sum of the input data rates exceeds the data throughput rate of the node.

Traffic congestion control is thus an important consideration in communications networks. One method of network management which may be suitable for use in future networks is so called policy-enabled networking. An example of the policy-enabled networking is Quality of Service (QoS) provisioning using the so called 'DiffServ' architecture. 'DiffServ' refers to the IP Differentiated Service architecture, where QoS provisioning is obtained by marking data units. Different marked packets will receive a different priority in queuing and/or scheduling of nodes (so-called Per-hop-behaviour).

Network nodes can comprise buffers for storing received data before it is distributed further in the direction of data flow. Packet loss occurs for example whenever the buffers are over filled. One proposed buffer management technique is referred to as the "Drop Tail" technique according to which packets arriving at a full buffer are dropped. A number of variations of the "Drop Tail" technique have also been proposed. An example of such a variation is the "Drop front" technique in which packets are dropped at the start of the buffer when they arrive at a full buffer. An example of another approach is the "Random Early Drop" (RED) technique in which all arriving packets are dropped with a fixed probability if the queue length of the buffer exceeds a predetermined threshold. A problem with proposed congestion control techniques is that packet losses are generally incurred before the congestion is brought under control.

For example, communication networks employing transfer control protocol (TCP) manage traffic congestion by allocating congestion windows of various sizes to senders. These congestion windows are used to limit the transmission rate by varying their size. When a connection is established, the congestion window allocation policy permits the user to increase transmission rate rapidly by doubling the congestion window size (and thus also transmission rate) every round trip period. Transfer control protocol resources monitor the congestion window size having regard to a threshold window size. When the congestion window size reaches this threshold, the window size is increased at a much slower rate, for example by one window segment every round trip period. A problem with such congestion control schemes is that transmission rate is decreased only after packet losses are detected. The lost packets are in general replaced by re-transmission, causing delays and using network resources for data which has already been transmitted.

FIG. 1 shows a known network node 20. The node 20 comprises buffer circuitry 22 and an associated controller 24. For the sake of clarity, FIG. 1 shows packet transfer in a downlink direction only. However, a skilled person will appreciate that buffers can also provide for packet transfer in an uplink direction. It will also be evident that packets may be received from and/or distributed to respective pluralities of nodes on either side of the node 20 shown in FIG. 1. Each received packet 26 is stored within the buffer 22 of the node 20 until it can be output. In general, temporary storage gives the control circuitry time to access routing information within or appended to the packet and/or to ensure the next network node can receive the packet. Packets may be sorted and or multiplexed by the control circuitry 24. Packets 28 output from the node 20 are sent in a downlink direction towards the next node or user equipment.

If the throughput rate of the node 20 is high relative to the rate of receipt of packets then the packets spend only a short time in the buffer 22. However, when the aggregate transmission rate of the incoming packets 26 exceeds the throughput capacity of the node 20 queues build up in the buffer and the packets are delayed in the buffer 22. If the rate of packet receipt continues to exceed the rate of packet throughput the buffer may overflow. Random early detection (RED) can detect traffic congestion in buffers early and convey congestion notification to senders so that they can reduce transmission rate. To this end the random early detection technique monitors an exponentially weighted moving average of buffer queue length. When the average queue length exceeds a minimum queue length threshold EDLmin, but remains below a maximum queue length threshold EDLmax, packets are randomly dropped (or marked with an explicit congestion notifier). On recognition that packets have been dropped (or on receipt of such a notifier) the sender can reduce transmission rate with a view to relieving congestion in the buffer. When the average queue length exceeds the maximum queue length threshold EDLmax all packets are dropped (or marked).

Although random early detection represents one way of relieving traffic congestion in buffers it is not an ideal solution. For example, when random early detection is used in conjunction with a packet drop strategy it suffers significant packet losses. When used in conjunction with congestion notifiers, random early detection can cause the sender to reduce transmission rates to such an extent that network resources are under used. Further, random early detection does not differentiate between different flows or different classes of flows nor take any account of the number of connections. These factors can all effect the rate of change of queue lengths and thus queue lengths managed using the RED technique are prone to oscillate in length.

In random early detection techniques the threshold buffer occupancy levels at which packet discarding begins are fixed and may only be varied by reconfiguring the system. That is, these threshold levels do not take into account network conditions.

Moreover, proposed congestion management techniques tend to drop packets randomly, without taking into account the importance of the information contained therein.

In a wireless network, congestion is a normal problem, as these networks connect a slow radio link to a high speed backbone. The radio link is slow as the capacity is limited and fluctuating, i.e. a decrease in radio link quality triggers an increased number of retransmission (for Non-real time) and/or a higher protection (ie more redundant bits over the radio) of the data sent. On the contrary, connection to external data network such as the internet can be done at very high speed. Therefore, in a wireless network, the congestion naturally occurs in the network element where the high speed backbone meets the slow radio link. Particular examples of these NE are the 2G SGSN which is flow controlled from BSC, but has no mean to flow control GGSN, and the RNC which receives data from 3G SGSN through the Iu interface, but cannot flow control this one.

Another interesting aspect of the wireless system is the possibility to negotiate QoS across the system, in particular a maximum throughput for one mobile flow (PDP context in GPRS/UMTS term) is negotiated and is enforced (using policing and shaping) for downlink packets at the gateway node (GGSN). In the case of a radio network controller, the maximum throughput of non real-time traffic on a link to a mobile will be negotiated so as to be as close as possible to the maximum capability of the mobile station. However as network loading increases, and/or quality of service decreases, the rate of throughput of the radio network controller becomes lower for this mobile, but still the GGSN forward all downlink packets (up to a maximum throughput much higher than the possible throughput on the loaded radio) as it does not receive any indication of the radio condition. A consequence is that the radio network controller can become flooded with packets, some of which are lost within it. Thus network resources are wasted and the network node, in this example the radio network controller can become unstable.

SUMMARY OF THE INVENTION

According to a first aspect of the present invention there is provided a method of controlling congestion of communication traffic in a communications network, the network comprising a first node operable to receive communication traffic in the form of data from one or more sending nodes and to pass said data to one or more receiving nodes, the method comprising:
    monitoring the possible output data rate of said first node and detecting if the possible output data rate becomes smaller than a maximum data rate value; and
    responsive to said monitoring step performing congestion control whereby the data throughput of a flow of data through said first node is decreased.

Preferably the method further comprises negotiating selected communication traffic parameters with said first node via a second node, thereby controlling the flow of communication traffic through said first node, where communication traffic parameter comprises a maximum bit rate value, and said second node comprises a policing function to enforce the said maximum bit rate (i.e. police the traffic so that first node is never receiving more than maximum bit rate).

Preferably the at least one threshold level is adjusted taking into account network conditions.

Conveniently the at least one threshold level is adjusted taking into account preceding data occupancy levels.

According to a second aspect of the present invention there is provided apparatus for controlling congestion of communication traffic in a communications network, the network comprising a first node operable to receive communication traffic in the form of data from one or more sending nodes and to pass said data to one or more receiving nodes, the apparatus comprising:
    means for monitoring the possible output data rate of said first node and detecting if the possible output data rate becomes smaller than a maximum data rate value; and
    means, responsive to said monitoring step, for performing congestion control whereby the data throughput of a flow of data through said first node is decreased.

Embodiments of the invention are capable of reducing congestion before early random dropping of packets begins or other packet losses are incurred. Embodiments of the invention may be used in the provision of services with differently defined quality characteristics for different users or traffic classes. The embodiments are independent of the transport technology (packet-based or cell-based) or network architecture (connection oriented or connectionless). Preferred embodiments can be used to dynamically manage traffic congestion by automatically adjusting buffer occupancy threshold levels (e.g. based on time of the day and historical consideration) without modifying how TCP functions and thus may be used to improve congestion control at any network node.

BRIEF DESCRIPTION OF DRAWINGS

For a better understanding of the present invention, reference will now be made by way of example to the accompanying drawings in which.

DESCRIPTION OF PREFERRED EMBODIMENTS OF THE INVENTION

In this description a (data) packet or other data unit is a sequence of bits which is typically consecutive. In a data unit the sequence of bits are defined according to the protocol of the data unit. A flow is a sequence of data units such as the data packets that can be categorised according to a well-known criteria, such as source-destination-protocol-ports tuplets (IPv4) or flow identifier (IPv6). In wireless network such as GPRS or UMTS a flow corresponds to a PDP context. The data units in a flow may be consecutive. To give an example, two packets $p_1$ and $p_2$ belong to the same flow. The packets $p_1$ and $p_2$ can be multiplexed with packets q of another flow. The packets $p_1$ and $p_2$ may also be head to tail in the time domain but are still distinguishable as two different packets. This means that packet p1 and p2 cannot be considered as one single packet, even though the consecutive bits belong to the same flow. A data entity or unit may have a variable length (e.g. Internet Protocol data packets) or a fixed length (e.g. ATM cells). In the context of embodiments of the present invention "data" can include voice information as well as or instead of for example conventional data packets.

Figure 2:
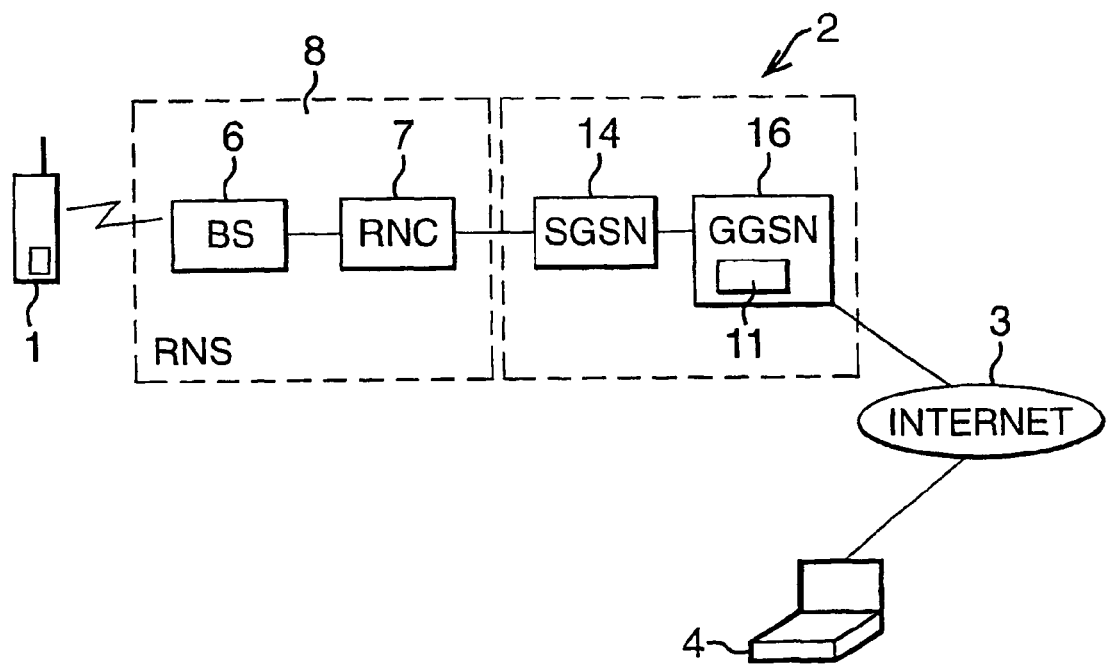
FIG. 2 shows a communication system.

FIG. 2 shows a communication system that provides data communication resources embodying the present invention. The communication system is capable of providing wireless data transportation services for a mobile station 1 thereof by means of a wireless network also called public land mobile network (PLMN) 2. Another user 4 is provided with fixed line data services by means of a connectionless data network 3. An example of a data network environment where embodiments of the invention may be applied is a server network where data is retrieved from different servers. It should be appreciated that while embodiments of the invention mentioned herein are described in the context of a UMTS (Universal Mobile Telecommunications System) or GPRS (General Packet Data Radio System) and an Internet Protocol (IP) network.

A mobile station 1 or other appropriate user equipment is arranged to communicate via the air interface with a transceiver station 6 of an access entity of the PLMN system 2. It should be appreciated that the term mobile station is intended to cover any suitable type of wireless user equipment, such as portable data processing devices or web browsers. The term "base station" will be used in this document to encompass all elements which transmit to and/or receive from wireless stations or the like via the air interface.

The base station 6 is controlled by a radio network controller RNC 7. The radio network controller 7 and the base station 6 belong to a radio network subsystem RNS 8 of a radio access network RAN (e.g. a UTRAN: UMTS Terrestrial RAN). It should be appreciated that a UMTS radio access network is typically provided with more than one radio network controller, and that each radio network controller is arranged generally to control more than one base station 6 although only one base station is shown in FIG. 2.

The radio network subsystem 8 is connected to the core network of the PLMN system, e.g. to a SGSN (serving GPRS support node) 14. The SGSN 14 keeps track of the mobile stations location and performs security functions and access control. The SGSN 14 is connected to a GGSN (gateway GPRS support node) 16. The GGSN 16 provides interworking with the other data network 3. The GGSN 16 acts as a gateway between the PLMN network 2 and the other data network 3, which in this example is an IP based data network.

Another user terminal 4 is shown connected to the data network 3. The exemplifying arrangement is such that the mobile station 1 and the terminal 4 may communicate via the data networks 2 and 3. However, it should be appreciated that embodiments of the invention may be applied to other types of data communication arrangements as well, such as to an arrangement where the user 1 (or 4) communicates with an element that is implemented within the network 2 (or 3) or to an arrangement where two elements of the network 2 (or 3) communicate data internally within the network.

Although not shown, the data communication system of FIG. 2 may also be connected to conventional telecommunications networks, such as to a GSM based cellular public land mobile network (PLMN) or to a public switched telephone network (PSTN). The various networks may be interconnected to each other via appropriate interfaces and/or gateways.

In use, the communication system of FIG. 2 can carry various types of communication traffic, including packets of TCP/IP traffic. The nodes of the communication system negotiate for network resources in order to optimise the capacity and performance of the communication network. The mobile station 1 the Radio network controller RNC, the serving GPRS support node 14 and the gateway GPRS support node 16 negotiate a bearer characterised by a quality of Service (QoS) profile. This negotiation takes place during the PDP context activation or a PDP context modification (see 3GPP 23.060 v.3.4.0 for reference).

For example, GPRS and UMTS quality of service parameters define classes such as "conversational", "Streaming", "interactive", "background" These classes have different requirements in terms of for example maximum allowed delay, jitter and packet loss tolerances which are further indicated by other parameters. The following parameter are especially relevant for this invention:

The maximum throughput rate of a flow is related to maximum allowed bit rate and is enforced by GGSN on downlink and by RNC on uplink. The guaranteed bit rate is only used for real time data and is typically related to the speech code bit rate used.

Traffic handling priority specifies the relative importance for handling of all packets belonging to the flow compared to the packets of other flows.

The Admission/Retention priority specifies the relative importance compared to other flows for allocation and retention of a given flow. The Allocation/Retention Priority attribute is a subscription parameter which is not negotiated from the mobile terminal.

(Please refer to 3GPP 23.107 v.3.3.0 for the complete list of QoS attributes)

The maximum data rate used in the description refers to the maximum bitrate referred in UMTS standards as the maximum number of bits delivered by UMTS and to UMTS at a SAP within a period of time, divided by the duration of the period. The traffic is conformant with maximum bitrate as long as it follows a token bucket algorithm where token rate equals maximum bitrate and bucket size equals maximum SDU size. The conformance definition should not be interpreted as a required implementation algorithm. The purpose of maximum bitrate is for example, that it can be used to make code reservations in the downlink of the radio interface. Its purpose is 1) to limit the delivered bitrate to applications or external networks with such limitations 2) to allow maximum wanted user bitrate to be defined for applications able to operate with different rates (e.g. non transparent circuit switched data).

Other examples of Quality of service profiles may be found for example, in the GPRS system of ETSI release 97, defined sing other parameters such as precedence class, delay class, reliability class, mean (or peak) throughput class. The precedence class indicates the importance attached to a PDP context by the network operator. The delay class indicates the delay tolerance of a packet. The reliability class indicates the maximum number of packets which may be lost. The mean (or peak) throughput class is derived from the negotiated mean (or peak) throughput for the PDP context in question.

Maximum throughput rate parameters are used by the policing and the shaping functions at the Gateway GPRS Support Node (GGSN) 16 and/or other considerations. Therefore packets being transferred in the downlink direction may be dropped at the gateway GPRS support node 16 and/or the Serving GPRS Support Node (SGSN) 14 if the data packet rate exceeds the maximum throughput negotiated.

Figure 1:
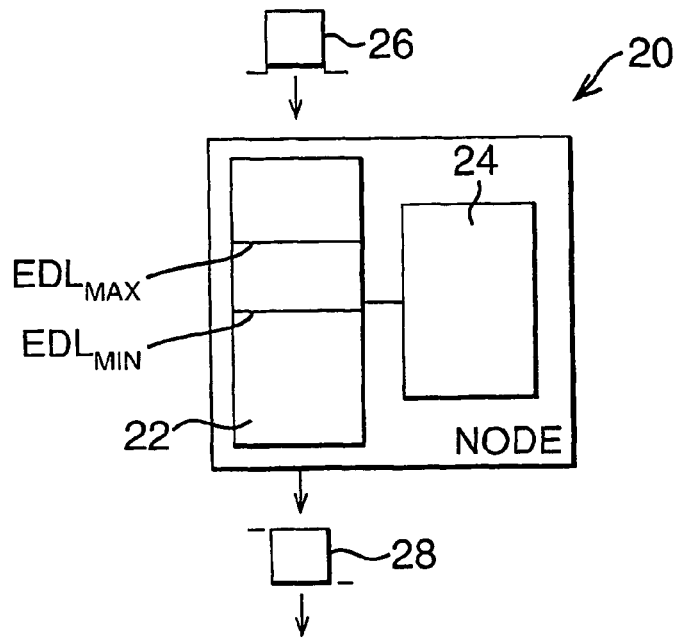
FIG. 1 shows a network node.

In addition, a radio link between a base station and a is mobile station has a fluctuating data throughput capacity which depends on for example link quality and the demand for retransmission of packets. Therefore packets being transferred in the downlink direction may also be dropped at the radio network controller RNC (e.g. if the capacity of the radio link is not sufficient to sustain the required throughput rate). It is also possible for the serving GPRS support node 14 to become overloaded. Thus, in the embodiment of FIG. 1 the radio network controller RNC, the serving GPRS support node 14 and the gateway GPRS support node 16 each comprise preventive congestion control means which provide a predetermined level of buffering according to a predefined set of rules as will be explained below. In other embodiments, not all of the network nodes 7, 14 and 16 are provided with preventive congestion control means. In a preferred embodiment in a UMTS network, only the RNC (8) is provided with such means.

Figure 3:
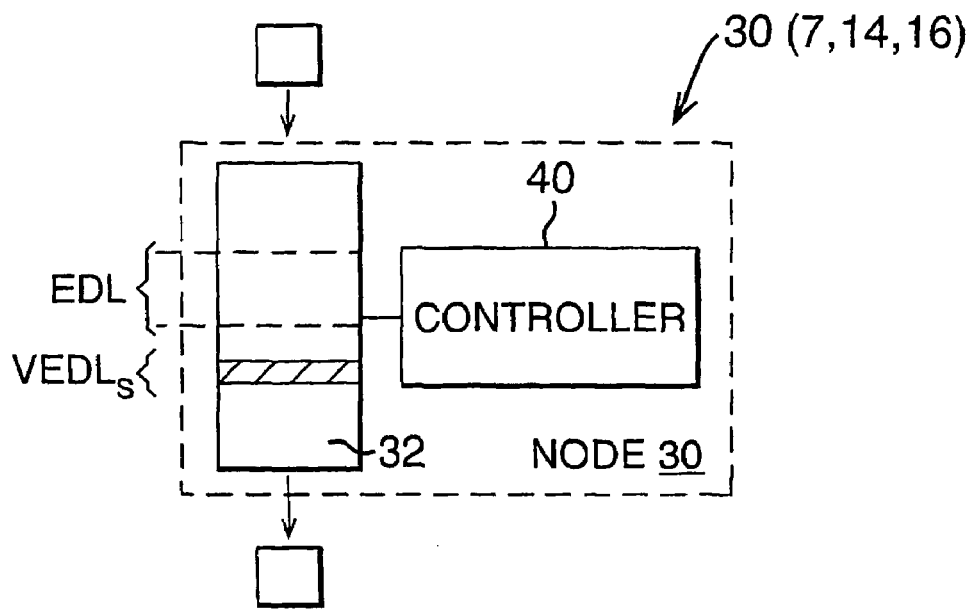
FIG. 3 shows a network node
Figure 4:
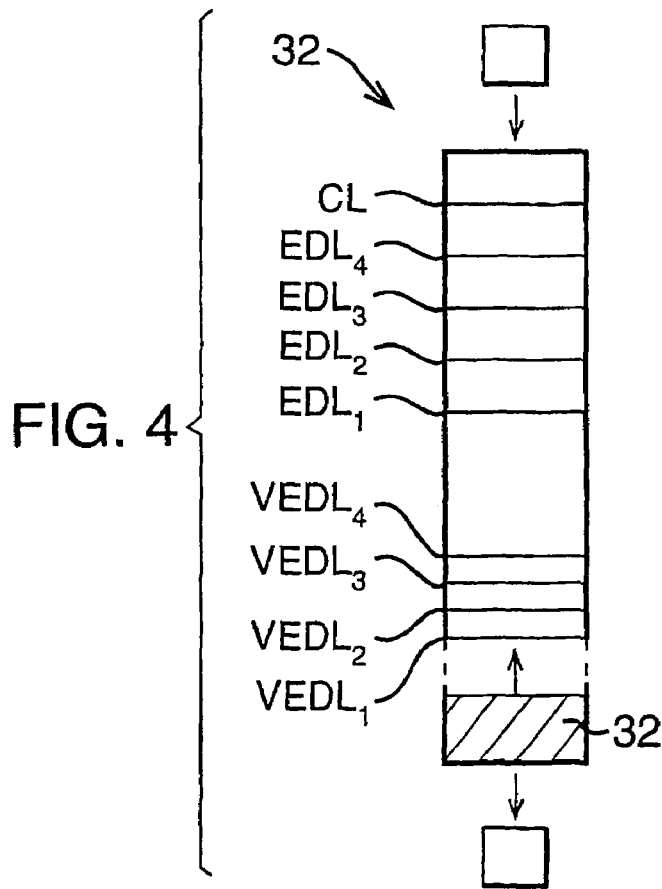
FIG. 4 shows a buffer arrangement in the network node of FIG. 3.

FIG. 3 shows a type of network node 30 which may be taken to represent any one (or more) of the nodes 7, 14 and 16 of FIG. 2. For the sake of clarity FIG. 3 shows packet transfer in the downlink direction only. In FIG. 3, the controller uses the buffer occupancy to determine the overall load of the node. Monitoring the buffer is considered as a practical means of monitoring the possible output data rate as it reflects the overall traffic at a given time. The possible output data rate is the rate at which the said first node expect to send data to the receiving node. This expectation is typically based on statistical behaviour taking into account one or more parameters. Such as for example, buffer level, number of flows established (i.e. PDP context or Radio access bearer), QoS parameters of the flow, radio parameters such as power level and amount of spreading code available, time of the day and history, or current data rate of this flow. Therefore monitoring the possible output data rate refers to monitoring one or more of these given parameters, and does not necessarily refer to direct measurement but rather on an estimation or evaluation deduced from one or more parameters. If the overall traffic (e.g. in one RNC area) is high, the buffers are quite full. Therefore the buffer occupancy level also detects if the realistic output of a certain flow becomes significantly smaller than the maximum possible rate of receipt of data that the mobile may be receiving in an empty network. Note however that alternative or additional means may be used by the controller such as the number of flows (Radio Access Bearer in RNC) currently active and their QoS. FIGS. 3 and 4 illustrate how lower threshold levels can be used in for example a buffer 32 of the node 30 in order to facilitate very early detection of congestion (i.e. preventive congestion control). In this way the buffer 32 can thus improve performance by gradually reducing congestion before starting to perform early packet discarding (Note that the invention can be understood as a possible complement of RED, and the detection levels do not have to be linked with RED's level: they may be higher or smaller). Embodiments of the present invention may incorporate one or more very early detection levels VEDLs as well as early detection levels EDLs of the type used in the complementary RED technique. As will be explained in more detail hereinafter buffer threshold levels of network nodes according to certain embodiments of the present invention can automatically adjust based on historical information on buffer occupancy levels.

Referring to the buffer 32 shown in FIG. 3, a plurality of predetermined buffer occupancy levels VEDLs are taken as a very early indication of congestion. When the occupancy level of the buffer 32 reaches the predetermined threshold level indicative of the beginning of congestion, the node 30 acts to reduce the maximum throughput of new and/or existing PDP context in accordance with a predefined set of rules. This reduction in maximum throughput increases of different flows the number of packets dropped by the policing function, which is the earliest point at which such systems can discard a packet. This early dropping of packets causes the TCP transmission rate to lessen with the effect that incoming traffic is slowed down and congestion relieved before significant packet losses are incurred. The result is that early detection permits TCP transmission rates to be slowed down gradually by incremental adjustments of the congestion window size. This means the network responds to very early signs of congestion much more effectively. In addition it saves transmission resource between GGSN-SGSN and SGSN-RNC. The RNC will also receive more stable flow of data for which allocating resources will be easier. Although not shown explicitly on FIG. 3, the very early detection levels VEDLs may comprise a plurality of threshold levels as explained with reference to FIG. 4.

The reduction in maximum throughput can be performed at any convenient node (for example at the RNC, SGSN or GGSN) and preferably takes into account UMTS Quality of Service parameters such as admission/retention priority and/or other factors as described with reference to FIGS. 5A and 5B. The early detection levels EDLs used by the RED algorithm are also shown on FIGS. 3 and 4 and it should be appreciated that the threshold levels VEDLs indicative of very early congestion are typically lower than the threshold levels, for example $EDL_{min}$ and $EDL_{max}$ used by the RED algorithm. Hence the threshold levels VEDLs are typically reached first when queue lengths increase due to congestion. This means that the congestion control measures defined in association the thresholds VEDLs are in general performed before any packets are discarded under RED principles.

Figure 5A:
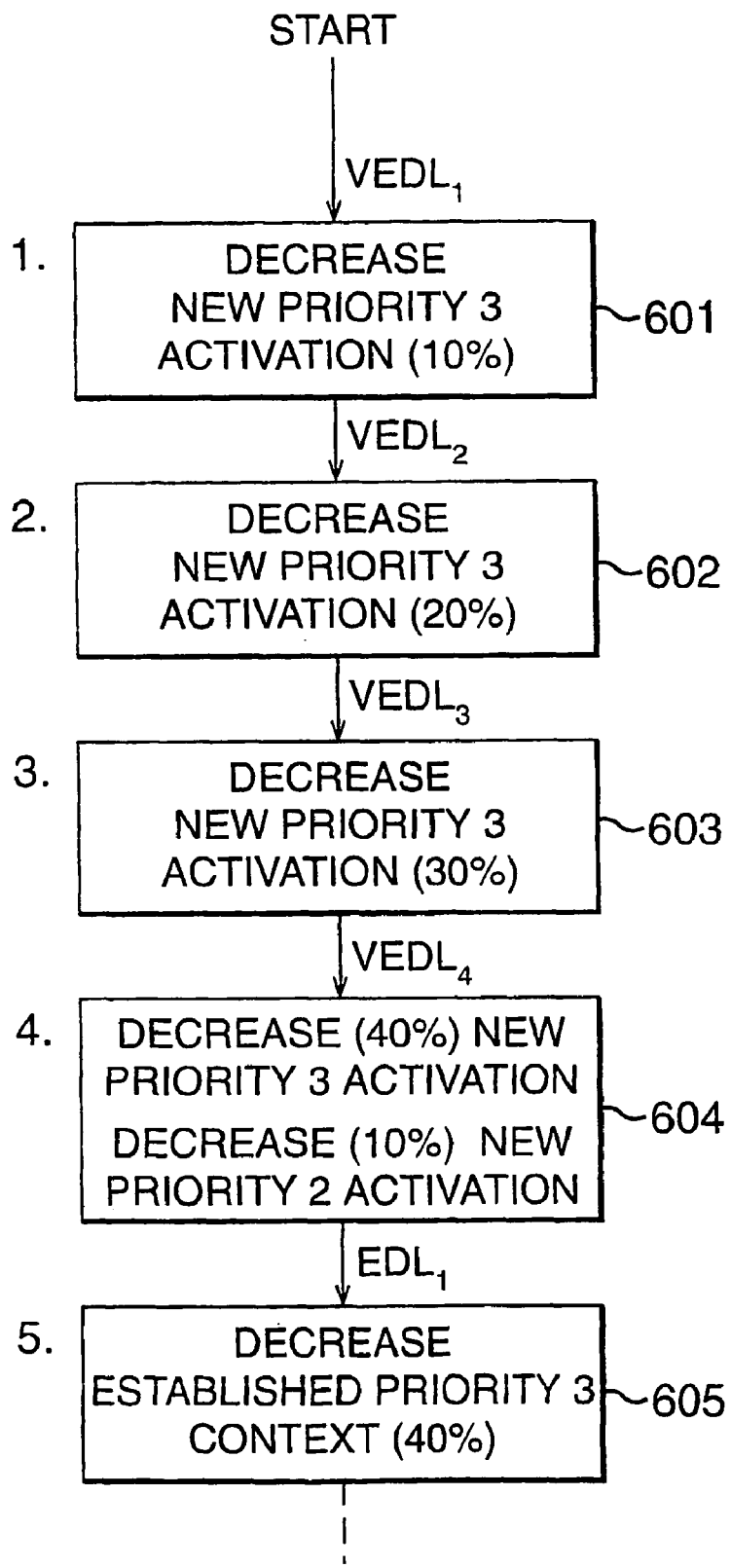
FIGS. 5A and 5B show steps for carrying out congestion control.
Figure 5B:
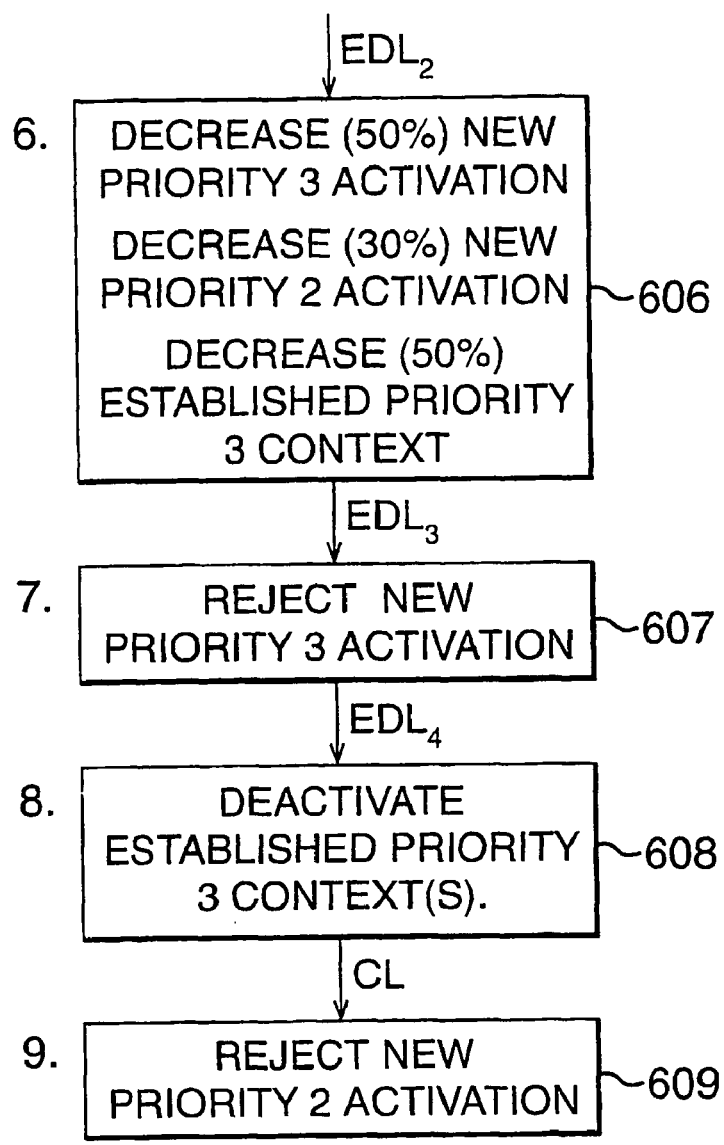

FIGS. 4, 5A and 5B illustrate a congestion control apparatus and method embodying the present invention in more detail. The method includes defining different threshold buffer occupancy levels in a buffer and performing congestion management actions responsive to buffer occupancy levels reaching the threshold levels. In this method a set of nine different detection levels are employed (see in particular FIG.

4). The levels comprise four very early detection threshold levels $VEDL_{1-4}$, four early detection threshold levels $EDL_{1-4}$ and a congestion level CL. The method can be implemented by monitoring the occupancy level of a send buffer 32 of the node and using buffer occupancy level information as an input in connection admission control.

Referring in particular to FIGS. 5A and 5B, the threshold levels indicative of very early detection $VEDL_{1-4}$, are reached first as traffic (very early congestion) causes queue length to grow. When the buffer queue length reaches the first very early detection level $VEDL_1$, the controller 40 acts to decrease the maximum throughput of new PDP activation for allocation/retention priority 3 by a predetermined amount, in this case 10% (see step 601).

As the queue length increases further to the second very early detection level $VEDL_2$, the controller 40 decreases maximum throughput of new PDP activation for allocation/retention priority 3 by a further amount, in this case by a further 20% (see step 602).

When the buffer queue length reaches the third very early detection level $VEDL_3$, the controller 40 decreases the maximum throughput of new PDP activation for allocation/protection priority 3 by 30% (see step 603).

If the buffer queue length reaches the fourth very early detection level $VEDL_4$, the controller 40 decreases the is maximum throughput of new PDP activation for allocation/retention priority 3 by 40% and also decreases the maximum throughput of new PDP activation for allocation/retention priority 2 by 10% (see step 604).

Any one of steps 601 through to 604 of FIG. 5A may be sufficient to relieve congestion without packet loss in the node implementing this mechanism.

In serious cases of congestion queue lengths may continue to increase and it is possible that buffer queue lengths will reach the first early detection level $EDL_1$. The level $EDL_1$ may correspond to the RED minimum threshold level and hence the congestion control mechanism may begin to discard packets in dependence upon queue lengths. In addition, established PDP context with allocation/retention priority 3 may be gradually decreased by 40% (see step 605). This decrease may be initiated starting from the highest maximum throughput or it may be that the mobile station experiences bad radio conditions. If a mobile experience bad radio conditions, many packets may need to be retransmitted before they are properly received. Therefore the overall throughput of the mobile is quite low. If the Mobile has been experiencing bad throughput for a certain time, it is probably located in a poor coverage area, and it makes sense to decrease its maximum throughput to a value close of the real throughput in the radio. The node may detect a bad radio condition from the amount of retransmission (applicable to RNC and 2G SGSN), and/or a flow control mechanism (2G SGSN), and/or radio power control (RNC). Of course, a combination of both is also possible.

In the event that queue lengths continue to increase it is possible that they will reach the second early detection level $EDL_2$. At this detection level the controller 40 decreases the maximum throughput of new PDP activation for allocation/retention priority 3 by 50%. The maximum throughput of new PDP activation for allocation/retention priority 2 is decreased by 30%. At the same time, the maximum throughput of established PDP contacts with allocation/retention priority 3 continues to gradually decrease to a total of 50% (see step 606). This decrease in maximum throughput may start from the highest maximum throughput or it is also possible that the mobile station experiences bad radio conditions (or by a combination of both). Alternatively, the maximum throughput may be reduced according to the maximum throughput experienced on the radio link. For example, when unfavourable conditions are experienced on the radio link, packets may be lost. In the case of packets protected by retransmission, if every packets needs to be retransmitted one time, the throughput experienced on the radio is half or its theoretical value) The effect is the same as when packets are lost from the buffer, the TCP transmission rate slows down and some lost packets may need to be retransmitted.

If queue lengths continue to rise and the third early detection level $EDL_3$ is reached, new PDP context activation for allocation/retention priority 3 is rejected (see step 607).

Further increases in traffic volumes could lead to queue lengths reaching the fourth early detection level $EDL_4$, at which level established PDP contexts for allocation/retention priority 3 are deactivated (see step 608).

In very serious cases of congestion buffer queue lengths may reach congestion level CL which corresponds to the maximum threshold level of RED techniques at which point all new packets are dropped. The controller 40 thus rejects new PDP context activation for allocation/retention priority 2 (see step 609).

It will be understood that we use here the word PDP context activation, which corresponds in RNC language to Radio Access Bearer establishment.

Figure 6:
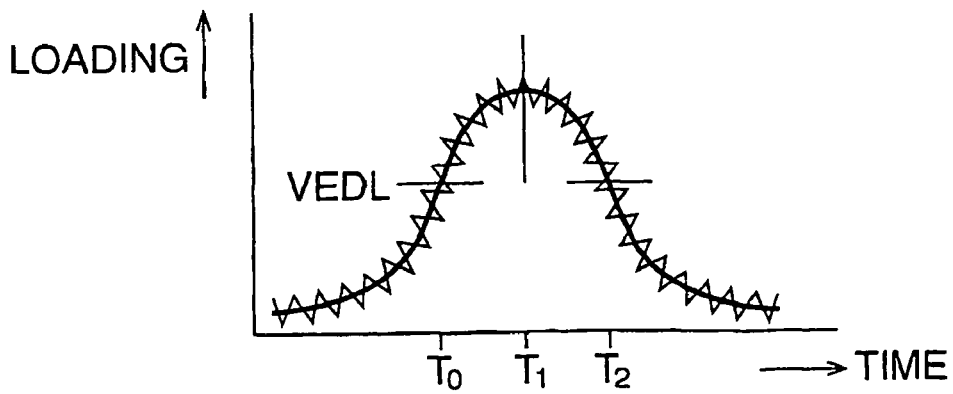
FIG. 6 illustrates how traffic loading conditions of a network may change over time.

FIG. 6 illustrates how network loading conditions increase predictably at certain points in time. For example, network loading conditions may increase at peak hours within a day or on particular days. Loading is plotted along the vertical axis and time along the horizontal axis. The loading oscillates randomly over the short term as individual users connect and disconnect from the network. However, it will also be apparent that in this case the loading trend generally increases over time to a maximum loading at a time $T_1$. It is possible that embodiments of the present invention could experience increasing queue lengths at around $T_0$, the correct response to which would be to take congestion control measures in order to avoid traffic loss during the peak loading occurring at time $T_1$. However it is also possible that short term oscillations in loading may cause the same very early detection level to be traversed in a positive direction at around the time $T_2$. Since general network loading is decreasing at time $T_2$ it may not be necessary to take congestion reducing measures. Congestion control measures performed when general network loading is decreasing tend to lead to under use of network resources.

A threshold data occupancy level (e.g. a VEDL) which leads to the triggering of congestion control measures can be automatically adjusted by the controller 40 based on information on previous data occupancy levels. For example, a moving average of recent preceding data occupancy levels can indicate whether the network loading conditions are experiencing an increasing or decreasing trend. Alternatively, longer term historical data can be used to build an indication of past network loading patterns. In addition, the type(s) and/or extent of the congestion control measure taken may depend upon for example a UMTS quality of service (QoS) parameter (in the above example admission/retention priority). Where history information is taken into account, congestion reducing measurements can be performed when the buffer queue length exceeds a predetermined threshold level before an anticipated peak in traffic volume but not when increase in traffic volume is not expected to occur.

One way to take into account past history is to use only a short term past history function. If the controller 40 recognises that the actual occupancy level is less than the average of a predetermined number n of past occupancy level measurements, then the controller 40 compares the existing threshold level to the very early detection level scale when the congestion is decreasing. This approach is referred to as "decreasing very early detection level". The computation may represent a weighted average with more relevance placed on most recent history. Similarly, if the controller 40 recognises that the actual occupancy level is greater than the average of a predetermined number of past occupancy level measurements, then the controller 40 compares the existing threshold to the very early detection level scale when the congestion is increasing. This is referred to as "increasing very early detection level". Again, the computed average may be weighted so that most relevance is placed upon recent history. In this way, embodiments can take into account whether general traffic loading conditions are changing towards increased volume or decreased volume before determining if, and to what extent, congestion control measures may be necessary.

Another way embodiments can taken into account past history is to use a longer past history function. In such cases actual occupancy levels are compared with the average of a predetermined number m of previous occupancy level measurements. The predetermined number m of previous occupancy level measurements used in a computation of the "long" past history value is greater than the number n used to compute the "short" past history value and a weighted average biased towards more recent occupancy level measurements can increase reliability in some applications.

The controller 40 may monitor at which time of the day (or time of the week) congestion is most problematic. Such embodiments can formulate a historical pattern of loading conditions and then categorise time periods as "very critical congestion risk", "critical congestion risk", "normal congestion risk" and so on. For example, a peak in traffic volume may occur every week day at around 9 am and 1 pm. The period preceding this peak in traffic volume could be categorised as "very critical condition risk". Typically the period preceding the "very critical condition" risk period would be a "critical congestion risk period".

Figure 7:
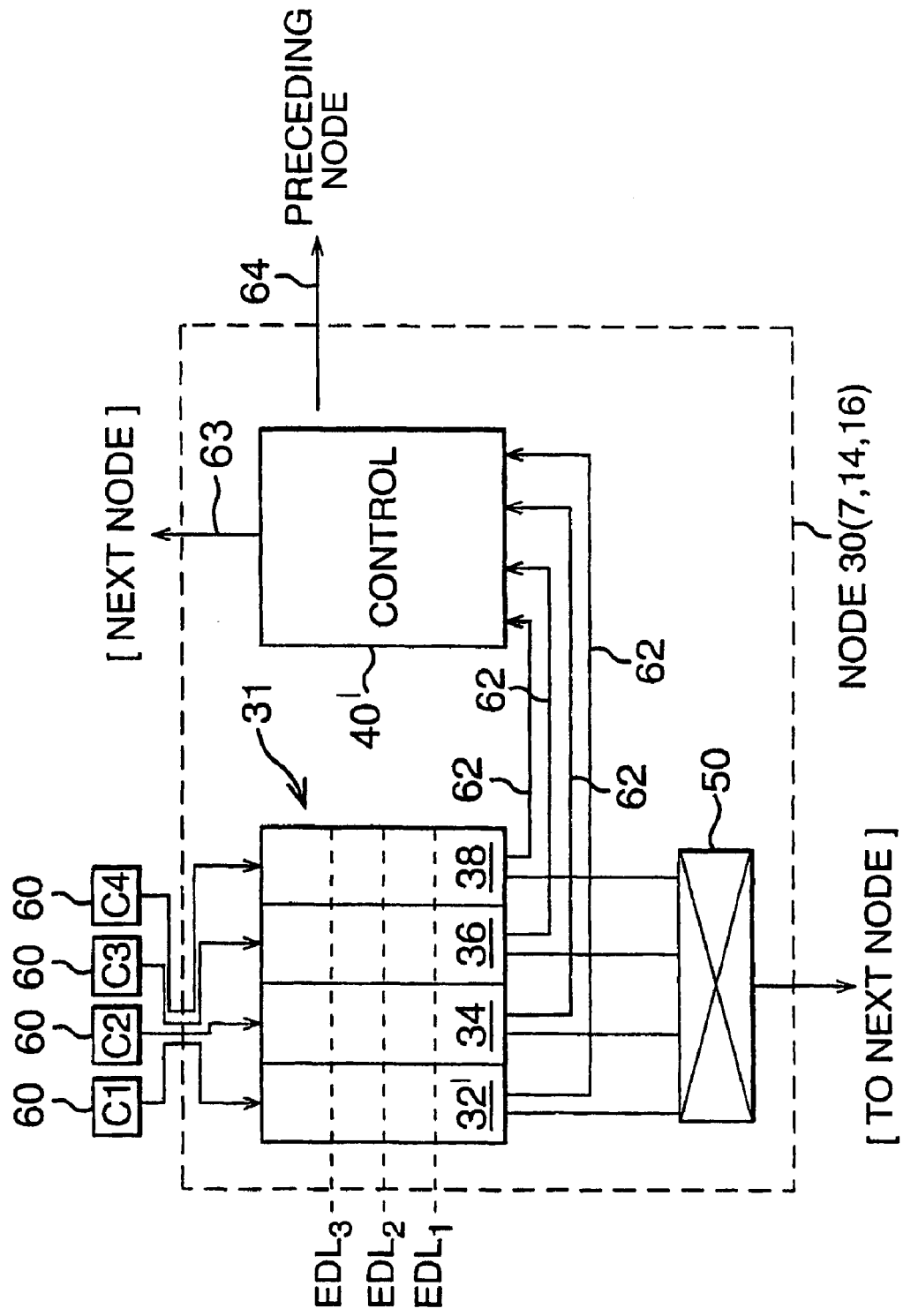
FIG. 7 shows another network node which may be included in the system of FIG. 2.

FIG. 7 shows another type of node 30 which may be taken to represent any one (or more) of the nodes 7, 14 and 16 of FIG. 2. The node 30 is capable of distinguishing between traffic classes. The node 30 comprises a plurality of buffers 31 including buffers 32, 34, 36 and 38. In this example, four buffers are provided, one for each traffic class C1, C2, C3 and C4. Each traffic class may be regarded as a different class of flows. The different traffic classes may be for example the UMTS classes mentioned above. In such a case different priorities are attached to different ones of the classes based on requirements of the classes. For example, the voice class has very strict requirements in both delay and packet loss. Streaming such as video data can tolerate some delay but jitter or packet losses must be avoided. Interactive communications such as browsing the internet can tolerate greater delays in transfer of packets. Finally, background transmissions have almost no minimum delay requirements. The node 30 also comprises a controller 40 and a multiplexer 50 which are also connected to each of the buffers 32-38. The controller 40 has control signal lines 62, 63, 64 connected to each of the buffers 32-38, the next node in the downlink direction and the preceding node. For example, if the node 30 is a radio network controller RNC 7 it will have control signal lines connected to the base station BS 6 and the SGSN 14 as well as to each of the buffers.

In use, the received packets 60 of different traffic classes C1, C2, C3, C4 are supplied to the buffers 31 and stored in respectively different buffers 32, 34, 36, 38 each of which is allocated to one of the traffic classes. The packets are held in the buffers 31 until the node 30 is ready to output them to the next node via the multiplexer 50. Buffer management, multiplexing and outputting functions are performed by means of the controller 40. Each of the buffers 32, 34, 36, 38 serving the different traffic classes has a queue length which may vary independently of the occupancy levels of the other buffers. In this way the controller 40 can manage the buffer of a particular traffic class with a greater priority than a buffer of a different traffic class.

The average queue length within each of the buffers 32 to 38 is monitored by the controller 40. The average queue length is calculated as an exponentially weighted moving average, for example by using a low pass filter. The computed average is queue length is then compared with one or more threshold levels to determine what action, if any, is required to avoid or reduce congestion in that buffer. The principles of random early detection may be applied in respect of each traffic class. For example when the average queue length in a buffer is below a minimum threshold, no arriving packets are dropped and when the average queue length is above a maximum threshold all arriving packets are dropped. When the average queue length between the maximum and minimum thresholds arriving packets are dropped with a probability dependent on the average queue length.

The or each threshold level applied in each of the different buffers 32, 34, 36 and 38 may be the same or different depending on the application. In this way different thresholds can be used with different traffic classes. Preferred embodiments have a different set of threshold levels in each buffer 32, 34, 36, 38.

Although the embodiment of FIG. 7 is arranged to control congestion of four traffic classes C1, C2, C3, C4, the RED mode of operation is explained below by reference to two traffic classes C1, C2 which are monitored having regard to three threshold levels $EDL_1$, $EDL_2$, $EDL_3$. Arriving packets belonging to traffic class C1 are accepted by the first buffer 32 without any packets being discarded whenever the average queue length of the buffer 32 is below a first minimum threshold $EDL_1$. Arriving packets belonging to the traffic class C2 are accepted by the second buffer 34 without being discarded if the average queue length of the second buffer 34 is below a second minimum threshold $EDL_2$. If the average queue length of the first buffer 32 is between the threshold levels $EDL_1$ and $EDL_2$ packets belonging to the traffic class C1 are discarded with a probability which depends on the average queue length of the first buffer 32. Similarly, if the average queue length of the second buffer 34 is between the threshold levels $EDL_2$ and $EDL_3$ packets belonging to the traffic class C2 are discarded with a probability which is a function of the average queue length of the second buffer 34. All packets belonging to the traffic class C1 are discarded if the average queue length in the first buffer 32 exceeds the threshold level $EDL_2$ and all packets belonging to traffic class C2 are discarded if the average queue length of the second buffer 34 is above the threshold level $EDL_3$. It will be apparent that random early detection principles can be extended to implement buffer management schemes taking into account any number of different traffic classes in for example Diffserv applications. Moreover, any number of threshold levels can be used and a given threshold level can apply to one or more of the traffic classes. Random early detection principles can also be used in buffer management schemes employing different quality of service (QoS) parameters, such as buffer space, bandwidth requirements and packet loss tolerances. An example of such an application is assured forwarding (AF) PHB in which different levels of QoS delivery define different threshold levels in a random early detection algorithm. Random early detection can be used in this context to quantify QoS guarantees provided by the congestion control mechanism in terms of delays and losses.

Employing random early detection principles as described above with reference to FIG. 6 has the benefit of distinguishing between different traffic classes (classes of flows). A corresponding arrangement can be used to distinguish between individual flows. However use of a random early detection algorithm alone may lead to inefficient use of the network. For example, in the case of implementation within a radio network controller RNC 7, a RED algorithm may discard packets of a mobile station when buffer queue length is relatively low, triggering the is transfer control protocol (TCP) to reduce transmission rates and possibly also cause the RNC 7 to release radio resources reserved for the mobile station. Further, another mobile station may be sent packets at close to maximum throughput rates when the radio channel is capable of only sustaining lower rates. This leads to large buffer queue lengths, delays and ultimately packet losses. Packet losses in turn lead to lower TCP transmission rates and necessitate retransmission of lost packets.

Figure 8:
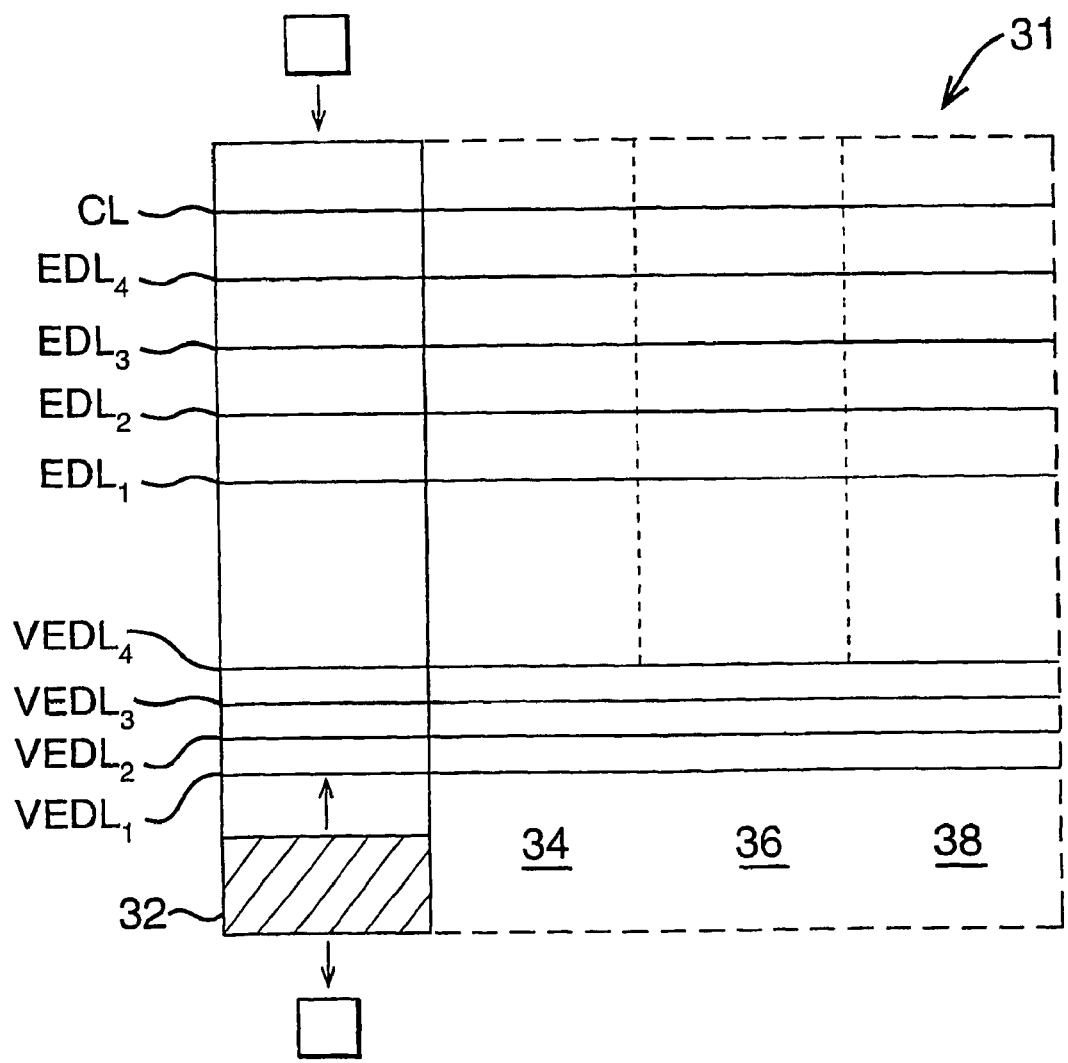
FIG. 8 shows the buffer arrangement of FIG. 7 in more detail.

FIG. 8 shows a buffer 32, which may be employed in the buffers 31 of the embodiment of FIG. 7. It will be apparent that such embodiments can eliminate packet losses by reducing the maximum data throughput rate of new and/or existing PDP context before packet losses are incurred in the same way as the embodiment described with reference to FIGS. 3, 4, 5A. 5B and 6 but has the added advantage of being capable of distinguishing between different classes of flows.

Embodiments of the present invention thus adjust one or more of the threshold levels which trigger congestion control measures based on historical information on buffer occupancy levels.

Advantageously, embodiments of the present invention can detect congestion earlier than with proposed RED techniques and can take congestion control measures before packet losses result from buffer overflow.

The action taken to relieve congestion could depend on factors other than the current detection levels reached by the queue lengths in the buffer. For example, the reduction of maximum throughput could take into account whether or not general traffic loading conditions are becoming better or worse.

Different very early detection level thresholds may be applied in the different categories of time periods such that the congestion control measures taken by the node take into account likely subsequent traffic volumes. Preferred embodiments employ the aforementioned "increasing very early detection level and/or decreasing very early detection level" in at least one of the different categories of periods. This approach reduces the number of instances in which congestion control measures are performed unnecessarily in periods before congestion in the network reduces without intervention. Alternatively, or in addition, the types of and extent of congestion control measures performed may depend on the category of time period in which the data occupancy threshold is passed.

Apparatus embodying the present invention do not rely on additional signalling as long as the maximum throughput of new PDP context is decreased or the new PDP context rejected. Additional signalling need only be undertaken when existing PDP context has to be downgrounded. That is why in the described preferred embodiment (FIG. 5A), the first step is to decrease new context.

In one modified version in which both the GGSN and the RNC implement preferred congestion control mechanisms, the GGSN and the RNC communicate to ensure that they do not decrease the same maximum throughput more than is necessary.

It is possible for maximum throughput to be decreased at a rate which increases linearly with increasing buffer occupancy levels.

In another modification, the nodes record the maximum throughput requested during negotiations in a storage location so that if the congestion clears the maximum throughput can be increased to the first requested level with re-negotiation.

Also some implementation may find beneficial to negotiate the maximum throughput a bit below the available capacity on the radio in order to guarantee a stable throughput (a higher but fluctuating throughput may affect TCP negatively, while a constant and slightly smaller throughput will help TCP to stabilize).

It is noted that the above-described solutions are applicable to any network architecture (connectionless or connection-oriented), underlying transport protocol (fixed-length or variable-length data units) or transport technology (wired or wireless). In the above-described UMTS system, the embodiment of the invention is described primarily in the context of a Radio network controller. However, in modified embodiments, the invention may alternatively or additionally be embodied in the SGSN and/or GGSN nodes in addition to or instead of the radio network controller. The data units used with described embodiments may be identifiable as belonging to different classes of flows. However, modification implement per flow buffering while retaining all of the advantages of preferred embodiments.

In general, the embodiments may be implemented independently of the type of the used transport protocol and at any desired node. It should also be appreciated that whilst embodiments of the present invention have been described in relation to wireless user equipment, embodiments of the present invention are applicable to any other suitable type of user equipment.

It is also noted herein that while the above describes one exemplifying embodiment of the invention, there are several variations and modifications which may be made to the disclosed solution without departing from the scope of the present invention as defined in the appended claims.

Embodiments of the present invention consist of a method of controlling congestion of communication traffic in a communications network, the network comprising a first node operable to receive communication traffic in the form of data from one or more sending nodes and to pass said data to one or more receiving nodes, and a second node capable of policing and/or shaping traffic based on parameters (maximum throughput) negotiated with the first node, the method comprising:

monitoring the possible output of said first node and detecting if the possible output becomes significantly smaller than the maximum possible rate of receipt of data with a certain threshold level; (A particular a practical implementation of this monitoring is monitoring the level of occupancy of the data in the data store having regard to at least one threshold data occupancy level) and performing preventive congestion control responsive to the possible output (i.e. preferably the monitored data occupancy level reaching the at least one threshold level) in dependence upon previous traffic loading conditions of the network, said preventive congestion control being preferably performed per flow. The preventive congestion control consisting either in decreasing the maximum throughput of new flow being requested (based on the QoS of these flows and on the currently expected maximum possible output) or in decreasing the maximum throughput of flow already established (based on the QoS of these flows and on the currently expected maximum possible output).

The invention is particularly applicable to a wireless network, where at certain times (e.g. night) the traffic is very low allowing mobiles to transfer data at the highest speed they can (e.g. 2 Mbits/s in UMTS), and during other times (e.g. busy hour) the amount of traffic restricts the transmission speed of the mobiles (as resources are shared among users) to a much lower value (e.g. 30 kbits/s). This is particularly applicable to Non-realtime data where resources are shared based on availability and traffic priority. It is also applicable to Real Time data if the Guaranteed bit rate can be negotiated separately from the maximum bit rate. In time of congestion, maximum bit rate should be equal to guaranteed bit rate, and as small as acceptable by the user.

Other embodiments of the present invention, provide congestion control measures which may be performed with detection sensitivity based on historical information on traffic loading conditions. In particular, the node may be able to predict the future expected maximum possible output (and not only the currently expected maximum possible output).

The invention claimed is:

1. A method, comprising:
   temporarily holding data in a data store of a first node if the rate of receipt of data at said first node exceeds a data throughput rate of the node;
   monitoring the level of occupancy of the data in the data store having regard to at least one threshold data occupancy level; and
   performing congestion control responsive to the monitored data occupancy level reaching the at least one threshold level, wherein said congestion control comprises decreasing the maximum throughput of at least one of a new data flow being requested or a pre-established data flow,
   wherein threshold data occupancy levels are adjusted based on expected future traffic loading conditions based on time of day and history.

2. A method as claimed in claim 1, wherein said maximum data rate value is equal to a maximum possible rate of receipt of data at said first node minus a predetermined threshold value.

3. A method as claimed in claim 1, further comprising:
   via a second node, negotiating selected communication traffic parameters with said first node to control the flow of communication traffic through said first node.

4. A method as claimed in claim 3, wherein said communication traffic parameter comprises a maximum bit rate value, and said second node comprises a policing function to enforce the said maximum bit rate.

5. A method as claimed in claim 1, wherein said performing congestion control is carried out in dependence upon previous traffic loading conditions of the network.

6. A method as claimed in claim 1, wherein the at least one data occupancy threshold level is adjusted taking into account network conditions.

7. A method as claimed in claim 1, wherein the at least one data occupancy threshold level is adjusted taking into account preceding data occupancy levels.

8. A method as claimed in claim 1, wherein data occupancy levels comprises information on an average of a predetermined number of previous data occupancy level measurements.

9. A method as claimed in claim 1, wherein information on preceding data occupancy levels comprises an average of a predetermined number of previous data occupancy level measurements, the average being weighted towards most recent measurements.

10. A method as claimed in claim 1, wherein a degree of congestion control performed at periods of high congestion risk exceeds that performed at periods of lower congestion risk.

11. A method as claimed in claim 1, wherein a degree of congestion control performed is varied based on anticipated future traffic levels.

12. A method as claimed in claim 1, wherein operating time periods for the network are categorized according to congestion risk.

13. A method as claimed in claim 1, wherein a different threshold occupancy level is used to trigger congestion control in time periods of different categories.

14. A method as claimed in claim 1, further comprising:
   requesting a data transfer rate by a communication node, wherein a congestion control measure is performed including connecting a new data flow with a lower than requested transfer rate.

15. A method as claimed in claim 1, wherein a congestion control measure performed includes reducing the transfer rate of an established data flow by a predetermined amount.

16. A method as claimed in claim 1, wherein a congestion control measure performed includes rejecting a request to establish a new data flow.

17. A method as claimed in claim 1, wherein a congestion control measure performed includes terminating an established data flow.

18. A method as claimed in claim 1, wherein a combination of congestion control measure are performed at the same time.

19. A method as claimed in claim 1, further comprising:
   performing congestion control on a new data flow in preference to or to a greater extent than on an established data flow.

20. A method as claimed in claim 1, wherein the communication traffic is comprised of data having different levels of priority and congestion control measures are performed taking into account the priority level of the data.

21. A method as claimed in claim 20, wherein the type of congestion control measure is selected in dependence on the priority level of data.

22. A method as claimed in claim 18, wherein communication traffic is comprised of a plurality of different classes of data, each said class of data being held in a different data storage location of a data store.

23. A method as claimed in claim 22, further comprising:
   applying different threshold data occupancy levels to the different storage locations of the data store.

24. A method as claimed in claim 23, wherein the at least one threshold level comprises a set of threshold levels.

25. A method as claimed in claim 20, performed in a cellular communication network, where said different priority levels are based on a quality of service parameter.

26. A method as claimed in claim 25, wherein data is prioritized based on allocation or retention priorities in a universal mobile telecommunication system network.

27. A method as claimed in claim 1, wherein said first node comprises a radio network subsystem.

28. A method as claimed in claim 1, wherein said first node comprises one of:
   a radio network controller;
   a serving general packet radio service support node;

a gateway general packet radio service support node; and another node in a public land mobile network.

29. A method as claimed in claim 1, wherein a throughput rate request from a communication node is recorded.

30. A method as claimed in claim 1, further comprising:
passing information on data losses between nodes for purposes of charging.

31. An apparatus, comprising:
a holding unit configured to initiate temporarily holding of data in a data store of a first node if a rate of receipt of data at the first node exceeds a data throughput rate of the node;
a congestion controller configured to monitor a level of occupancy of the data in the holding unit having regard to at least one threshold data occupancy level, the congestion controller also configured to perform congestion control responsive to the monitored data occupancy level reaching the at least one threshold level, the congestion controller further configured to decrease a maximum throughput of at least one of a new data flow being requested or a pre-established data flow, wherein threshold data occupancy levels are adjusted based upon expected future traffic loading conditions based on time of day and history.

32. An apparatus, comprising:
holding means for temporarily holding of data in a data store of a first node if a rate of receipt of data at the first node exceeds a throughput rate of the node;
congestion control means for monitoring a level of occupancy of the data in the holding unit having regard to at least one threshold data occupancy level, the congestion control means also configured for performing congestion control, responsive to the monitored data occupancy level reaching at least one threshold level, to decrease a maximum throughput of at least one of a new data flow being requested or a pre-established data flow, wherein threshold data occupancy levels are adjusted based upon expected future traffic loading conditions based on time of day and history.

33. An apparatus as claimed in claim 31, wherein said maximum data rate value is equal to maximum possible rate of receipt of data at said first node minus a predetermined threshold value.

34. An apparatus as claimed in claim 31, further comprising:
a controller configured to, via a second node, negotiate selected communication traffic parameters with said first node to control the flow of communication traffic through said first node.

35. An apparatus as claimed in claim 31, wherein said communication traffic parameter comprises a maximum bit rate value, and said second node comprises a policing function to enforce the said maximum bit rate.

36. An apparatus as claimed in claim 31, wherein said congestion control is carried out in dependence upon previous traffic loading conditions of the network.

37. An apparatus as claimed in claim 31, wherein the at least one data occupancy threshold level is adjusted taking into account network conditions.

38. An apparatus as claimed in claim 31, wherein the at least one data occupancy threshold level is adjusted taking into account preceding data occupancy levels.

39. An apparatus as claimed in claim 31, wherein data occupancy levels comprise information on an average of a predetermined number of previous data occupancy level measurements.

40. An apparatus as claimed in claim 31, wherein information on preceding data occupancy levels comprises an average of a predetermined number of previous data occupancy level measurements, the average being weighted towards most recent measurements.

41. An apparatus as claimed in claim 31, wherein a degree of congestion control performed at periods of high congestion risk exceeds that performed at periods of lower congestion risk.

42. An apparatus as claimed in claim 31, wherein a degree of congestion control performed is varied based on anticipated future traffic levels.

43. An apparatus as claimed in claim 31, wherein operating time periods for the network are categorized according to congestion risk.

44. An apparatus as claimed in claim 31, wherein a different threshold occupancy level is used to trigger congestion control in time periods of different categories.

45. An apparatus as claimed in claim 31, wherein a data transfer rate is requested by a communication node, and wherein a congestion control measure is performed including connecting a new data flow with a lower than requested transfer rate.

46. An apparatus as claimed in claim 31, wherein a congestion control measure performed includes reducing the transfer rate of an established data flow by a predetermined amount.

47. An apparatus as claimed in claim 31, wherein a congestion control measure performed includes rejecting a request to establish a new data flow.

48. An apparatus as claimed in claim 31, wherein a congestion control measure performed includes terminating an established data flow.

49. An apparatus as claimed in claim 31, wherein a combination of congestion control measure are performed at the same time.

50. An apparatus as claimed in claim 31, further comprising:
a congestion controller configured to control en a new data flow in preference to or to a greater extent than on an established data flow.

51. An apparatus as claimed in claim 31, wherein the communication traffic is comprised of data having different levels of priority and congestion control measures are performed taking into account the priority level of the data.

52. An apparatus as claimed in claim 51, wherein the type of congestion control measure is selected in dependence on the priority level of data.

53. An apparatus as claimed in claim 49, wherein communication traffic is comprised of a plurality of different classes of data, each said class of data being held in a different data storage location of a data store.

54. An apparatus as claimed in claim 53, wherein different threshold data occupancy levels are applied to the different storage locations of the data store.

55. An apparatus as claimed in claim 54, wherein the at least one threshold level comprises a set of threshold levels.

56. An apparatus as claimed in claim 51, performed in a cellular communication network, where said different priority levels are based on a quality of service parameter.

57. An apparatus as claimed in claim 56, wherein data is prioritized based on allocation or retention priorities in a universal mobile telecommunication system network.

58. An apparatus as claimed in claim 31, wherein said first node comprises a radio network subsystem.

59. An apparatus as claimed in claim 31, wherein said first node comprises one of:

a radio network controller;
a serving general packet radio service support node;
a gateway general packet radio service support node; and
another node in a public land mobile network.

60. An apparatus as claimed in claim 31, wherein a throughput rate request from a communication node is recorded.

61. An apparatus as claimed in claim 31, wherein information on data losses between nodes for purposes of charging is passed.

62. A computer readable storage medium encoded with instructions configured to cause a processor to perform a process, the process comprising:

temporarily holding data in a data store of a first node if the rate of receipt of data at said first node exceeds a data throughput rate of the node;

monitoring the level of occupancy of the data in the data store having regard to at least one threshold data occupancy level; and performing congestion control responsive to the monitored data occupancy level reaching the at least one threshold level, wherein said congestion control comprises decreasing the maximum throughput of at least one of a new data flow being requested or a pre-established data flow, wherein threshold data occupancy levels are adjusted based on expected future traffic loading conditions based on time of day and history.

* * * * *